United States Patent
Hämäläinen et al.

(10) Patent No.: US 6,927,856 B2
(45) Date of Patent: Aug. 9, 2005

(54) METHOD FOR IMAGING MEASUREMENT, IMAGING MEASUREMENT DEVICE AND USE OF MEASURED INFORMATION IN PROCESS CONTROL

(75) Inventors: Esa Hämäläinen, Tampere (FI); Juha Vattulainen, Kangasala (FI)

(73) Assignee: Oseir Oy, Tampere (FI)

( * ) Notice: Subject to any disclaimer, the term of this patent is extended or adjusted under 35 U.S.C. 154(b) by 324 days.

(21) Appl. No.: 10/240,264

(22) PCT Filed: Mar. 30, 2001

(86) PCT No.: PCT/FI01/00313

§ 371 (c)(1),
(2), (4) Date: Sep. 30, 2002

(87) PCT Pub. No.: WO01/73384

PCT Pub. Date: Oct. 4, 2001

(65) Prior Publication Data

US 2003/0038944 A1 Feb. 27, 2003

(30) Foreign Application Priority Data

Mar. 31, 2000 (FI) .............................. 20000737

(51) Int. Cl.⁷ .............................................. G01N 21/25
(52) U.S. Cl. ...................................................... 356/419
(58) Field of Search ..................... 356/45, 419; 374/161

(56) References Cited

U.S. PATENT DOCUMENTS

| | | | |
|---|---|---|---|
| 4,222,663 A | * | 9/1980 | Gebhart et al. ................ 356/45 |
| 4,346,992 A | * | 8/1982 | Schwartz .................... 356/419 |
| 4,413,324 A | | 11/1983 | Tatsuwaki et al. |
| 5,225,883 A | | 7/1993 | Carter et al. |
| 5,822,070 A | | 10/1998 | Syré |
| 5,822,222 A | | 10/1998 | Kaplinsky et al. |
| 5,963,311 A | | 10/1999 | Craig et al. |
| 6,357,910 B1 | * | 3/2002 | Chen et al. .................. 374/131 |

FOREIGN PATENT DOCUMENTS

JP 07301569 11/1995

* cited by examiner

Primary Examiner—Gregory J. Toatley, Jr.
Assistant Examiner—Kara Geisel
(74) Attorney, Agent, or Firm—Venable LLP; Eric J. Franklin

(57) ABSTRACT

The invention relates to method for imaging measurement of a moving or flowing target and to an imaging measuring device for implementing the aforementioned method. Moreover, the invention relates to the use of information measured by means of imaging measurement in the control and/or adjustment of a process. According to the invention, electromagnetic radiation obtained from the moving or flowing target (T) is focused by means of imaging optics to produce an image to the screen of a two-dimensional matrix detector at least via a first and a second filter (F1, F2) which transmit electromagnetic radiation in manners differing from each other. Said at least first and second filter form on the screen of the detector at least a first and a second filter area (FR1, R2) that partly cover the light-sensitive area (DA) of the detector. The properties of the target (T) are determined spectroscopically by comparing and/or combining spectrally resolved information, which is recorded when a pixel which corresponds to a determined part of the target kto be measured and is focused on the screen (DA) of the matrix detector without beamsplitting travels under the effect of the movement of the target (T) via said at least first and second filter area (FR1, FR2). The area of the screen (DA) of the detector remaining outside siad filter areas (FR1, FR2) is used for other kind of imaging non-spectroscopic measurement and/or visualization of the target.

29 Claims, 4 Drawing Sheets

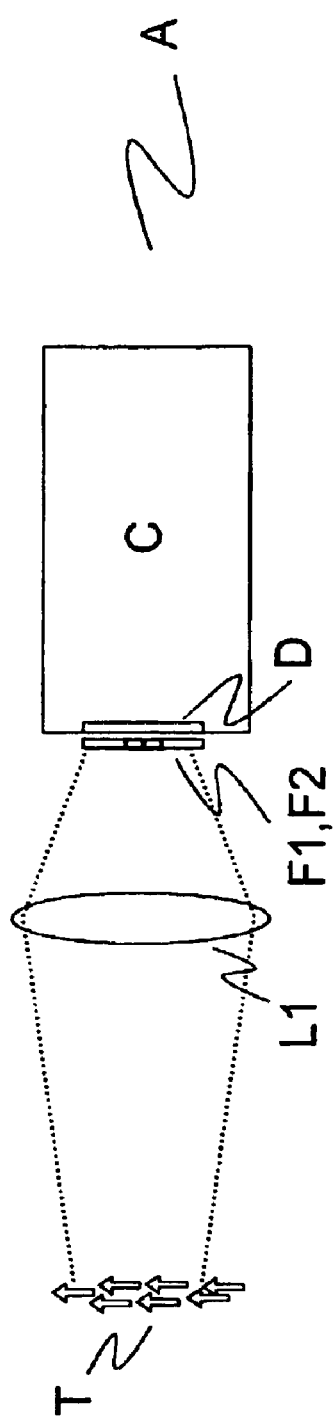
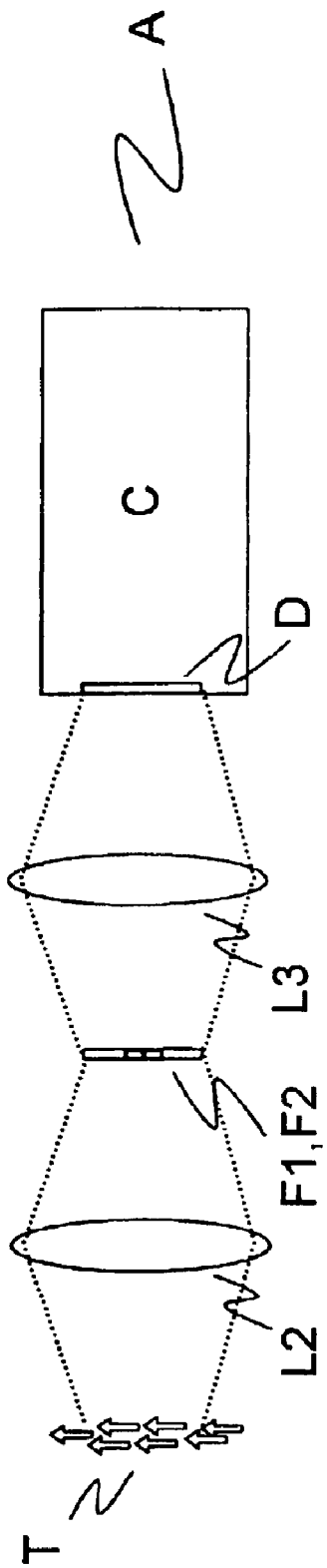

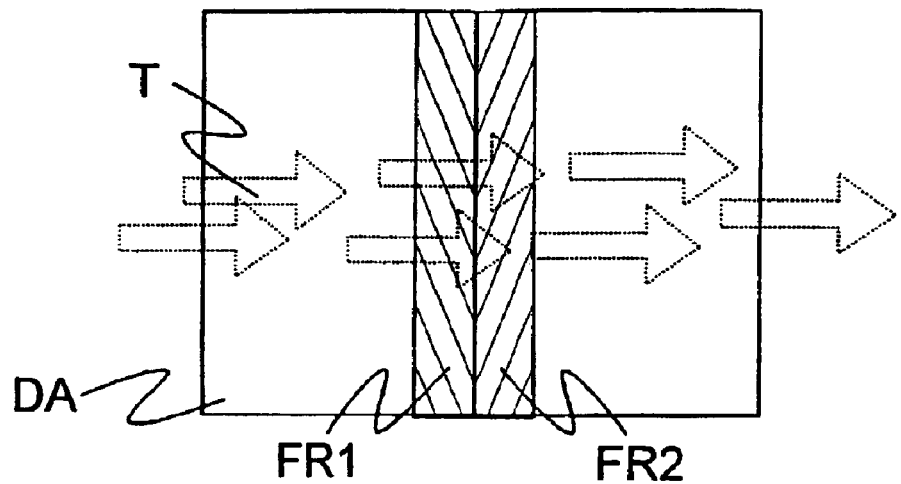
Fig. 3
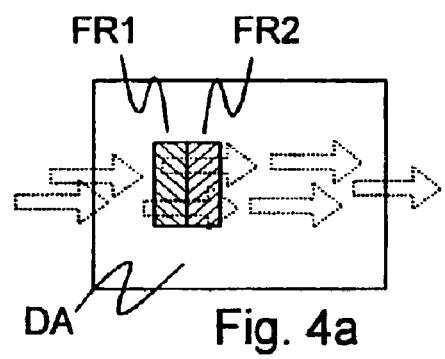
Fig. 4a
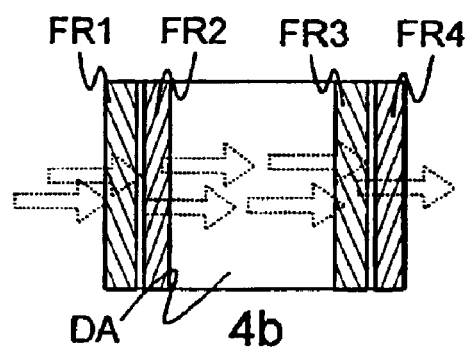
4b
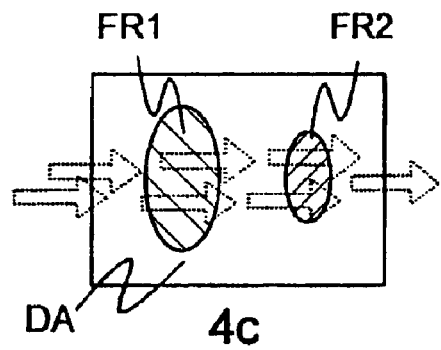
4c
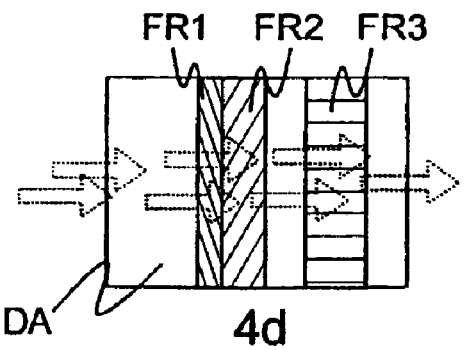
4d
Fig. 4

METHOD FOR IMAGING MEASUREMENT, IMAGING MEASUREMENT DEVICE AND USE OF MEASURED INFORMATION IN PROCESS CONTROL

FIELD OF THE INVENTION

The invention relates to method for imaging measurement of a moving or flowing target. The invention also relates to an imaging measuring device. Moreover, the invention relates to the use of information measured by means of imaging measurement in the control and/or adjustment of a process.

BACKGROUND OF THE INVENTION

In many technical processes it is advantageous to be able to measure the different parameters of the process in real time to examine, monitor and control said processes without disturbing the course of the process or state of the process itself. Optical measuring methods which are based on determining the state or properties of the target on the basis of the electromagnetic radiation (later shortly radiation) obtained from the target, offer according to their basic nature a possibility for non-intrusive measurements. Methods based on conventional physical probes, such as measurements using thermocouples (temperature measurement) or different methods based on sampling (e.g. concentration measurements) always disturb the target to be measured to a certain degree. When compared to traditional physical probes, by means of optical methods it is in many cases possible to conduct the measurements with a significantly better temporal and spatial resolution. It is also advantageous to use optical methods in connection with such processes in which the use of physical probes is impossible or difficult because of high temperatures prevailing in the process or other conditions hostile to the physical probes.

Optical measuring methods can be divided into different classes by means of various criteria. If the instantaneous spatial resolution attained by means of optical measuring methods is used as a comparison criterion, it is possible to divide the methods to non-imaging and imaging methods on the basis of this criterion. The basic differences between these methods are shortly described in the following.

In imaging methods the detector that is utilized is a suitable two-dimensional, spatially resolving detector (hereinbelow shortly matrix detector), wherein the electromagnetic radiation obtained from the target by means of suitable front optics is collected and focused on the light-sensitive screen of the aforementioned detector. In the wavelength range of visible light the matrix detector may be for example a so-called CCD or CMOS camera. The screen of the aforementioned detector is composed of separate small light-sensitive detector units (hereinbelow pixels), of which each pixel collects the radiation transmitted by a fixed part of the target according to the imaging properties of the front optics. When the radiation signal collected/detected by the aforementioned pixels during a predetermined integration time is changed into an electric form in such a manner that the pieces of information contained in different pixels are kept apart from each other, spatially resolved information is obtained from the area of the target that is imaged in the aforementioned manner, said information being collected from the entire area either exactly or substantially at the same time, depending on the structure and operating mode of the used detector.

In non-imaging methods the radiation is typically detected by means of only one such detector, such as a photo diode or a photomultiplier tube in which the radiation entering on the light-sensitive or radiation sensitive surface of the same produces an electric signal that cannot be traced as a function of the spatial location of the screen of the detector and thus, more specifically, as a function of the location of the radiation signal collected by said detector from the target. Thus, the properties of front optics are typically selected either in such a manner that radiation signal is collected simultaneously on the entire area of interest of the target, or alternatively in such a manner that a smaller measuring point detected by the detector in the target is temporally scanned to different sections of the target to obtain spatially resolved measurement information. In the latter case the information obtained from different sections of the target is, however, measured substantially at different moments in time, which is a significant restriction in cases where rapidly changing processes which are spatially heterogeneous are used.

The rapid development of detector technology and especially the development of matrix detectors both in the visible light range (wavelength range of approximately 300 to 800 nm) and in the ultraviolet range (<300 nm) and in infrared (>800 nm) has enabled a strong increase in the use of imaging measuring methods in research, monitoring and control operations of different processes applied in the industry. Together with the development of computer and image processing technologies enabling a more efficient processing of image information, the aforementioned matrix detectors nowadays make it possible to develop imaging measuring methods which function substantially in real-time.

Imaging optical measuring methods can be further divided into non-spectroscopic and spectroscopic methods. In non-spectroscopic imaging methods which typically include most of the conventional machine vision methods (the parameter to be measured for example the size, location or position of the target), the electromagnetic radiation obtained from the target is not divided especially according to the wavelength of radiation, but the radiation is detected typically only in one wavelength band. This wavelength band may be determined for example according to the radiation used for illuminating the target, and/or according to the natural spectral operation range of the matrix detector used in the measurement. It must be noted that in this text the term optical does not refer solely to the wavelengths of visible light (approximately 300 to 800 nm), but radiation with a substantially shorter (ultraviolet range) or longer wavelength (infrared range) than visible wavelength is also possible.

In spectroscopic methods, i.e. in methods based on spectral resolution the radiation obtained from the target is, however, divided into two or more spectral bands differing from each other, wherein by comparing and/or combining the signals/images measured at different wavelength bands it is possible to determine parameters of interest in the target, such as local temperature, or local concentration of a particular component of interest. More commonly used spectroscopic methods whose basic principles are known are for example two-color or multicolor pyrometry, by means of which it is possible to determine the temperature of the target on the basis of the electromagnetic radiation emitted spontaneously by the target. By means of a suitable external stimulus (e.g. laser light or so-called spectral lamps) it is also possible to conduct measurements based on optical absorption, or elastic (e.g. so-called Mie scattering from particles/droplets) or nonelastic (e.g. so-called fluorescence or Raman scattering) scattering of radiation, such as concentration measurements. The principles of the above-mentioned spectroscopic methods, which in this context include pyrometry as well, are generally and widely known, and therefore they will not be discussed in more detail herein since they do not form a part of the actual invention.

To implement the aforementioned spectroscopic methods, it is often necessary to use spectrally resolved information measured at least on two wavelength bands to define the parameter of interest in the target. In imaging methods this usually means that the spectral bands resolved from each other by means of a beamsplitter/beamsplitters and different optical filters are guided to a separate matrix detector each, or alternatively all spectral bands are guided to the same matrix detector in such a manner that the signals produced by them can be distinguished from each other.

Naturally, in spectrally resolving imaging measurements intended for industrial conditions and applications, the above-described use of several separate matrix detectors is problematic in that respect that said measuring devices have a complex structure and they are expensive. Therefore, a more interesting solution in view of industrial applications is the use of a single matrix detector for detecting all spectral bands to be measured and at the same time the attempt to reduce the number of optical components required in resolving said spectral bands and focusing them to the light-sensitive screen of the detector as well as to minimize the adjustments required in positioning these components, i.e. to simplify the structure, implementation and use of the measuring device. In industrial conditions another significant factor is also the compact mechanical structure of the measuring device which is attained in the above-described manner and which endures external conditions well.

The following is a description of known solutions that can be used with spectroscopic measuring methods and which enable imaging spectral resolution.

Patent publication U.S. Pat. No. 4,413,324 discloses three different ways of implementing spectrally resolved imaging measurement by means of matrix detectors. More precisely, the measurement in question is an imaging pyrometric two-color temperature measurement of a target, conducted by means of two measurement wavelength bands differing from each other. The first method described in the aforementioned publication is based on the use of optical filters of two different types placed in front of the screen of one matrix detector (camera), the spectral bands of the filters differing from each other. The aforementioned filters, the size of each of them advantageously corresponding exactly to the size of a single pixel in the detector, together form a continuous mosaic filter that covers the light-sensitive screen of the matrix detector entirely. A second method disclosed in the same publication is based on the temporal measurement of spectral bands at different moments in time by using a disc to be rotated in front of one matrix detector, said disc being composed of two different optical filters to attain spectral resolution. A third method disclosed in said patent publication is based on the act of dividing the radiation attained from the target into two spectral bands differing from each other, each band being guided to separate matrix detectors of their own. It is characteristic to all the methods disclosed in the patent publication U.S. Pat. No. 4,413,324 that two separate spectral bands are used in them and that the detector/detectors uses/use the entire imaging area for only one measuring method.

Patent publication U.S. Pat. No. 5,963,311 discloses another type of a device suitable for imaging two-color pyrometry, in which the radiation received from the target is divided into two parts, which parts are guided through different optical filters further to a matrix detector in such a manner that the images corresponding to different filters and representing different wavelength bands, which both correspond to the same area imaged from the target, are formed on the screen of the matrix detector adjacently with respect to each other. In the method disclosed in said publication the radiation received from the target is first used to form an image in the so-called intermediate focus of the optics, from which it is imaged on the screen of the actual detector. The use of the intermediate focus enables the adjustment of the magnification of the two adjacent images formed on the screen so that the magnification is equal in both images, as well as a better control of scattered light between said images.

Patent publication U.S. Pat. No. 5,225,883 discloses an arrangement suitable for imaging two-color pyrometry of a stationary or moving/flowing target. Similarly to the method disclosed above in the patent publication U.S. Pat. No. 5,963,311, in this case the radiation received from the target is divided into two parts, which parts are guided through different optical filters further to a matrix detector in such a manner that the images corresponding to different filters and representing different wavelength bands, which both correspond to the same area imaged from the target, are produced on the screen of the matrix detector adjacently with respect to each other. When compared to the solution disclosed in the publication U.S. Pat. No. 5,963,311, the solution presented in the publication U.S. Pat. No. 5,225,883 does not apply an intermediate focus in the adjustment of magnification, but in the other optical arm an optic component with a suitable refractive index is utilized to compensate the path length difference between the optical arms corresponding to the images, thus enabling the focusing of said two images on the screen of the detector by means of magnification which is exactly equal in both images.

It is characteristic to all above-presented imaging solutions that enable a substantially simultaneous spectrally resolved measurement on several spectral bands that the division and/or filtering of the radiation attained from the target into spectral bands that differ from each other takes place in such a manner that said process is conducted in the same way for the area imaged from the entire target, and the entire imaging area of the matrix detector/matrix detectors is thus used for the same spectroscopic measurement, such as two-color pyrometry. Thus, it is a drawback and a considerable restriction of the aforementioned methods in imaging measurements based on spectral resolution that they can be advantageously used only for spectroscopic measurements of one type at a time without changing or adjusting the optical components. Furthermore, the filters selected for a particular spectroscopic measurement are not optimally suitable for mere visualization of the target, or other non-spectroscopic measurements.

Moreover, it is a problem in the above-presented known solutions that it is necessary to use several optical components therein to divide and/or filter the light obtained from the target into different spectral bands and to focus it to the matrix detector, which said components must, in most cases, be adjusted and focused with great accuracy with respect to each other and/or the matrix detector. Especially in those known solutions in which the images measured on different spectral bands that correspond to the same location in the target, are projected separately (U.S. Pat. Nos. 5,963,3115, 5,225,883) next to each other on the screen, the picture elements corresponding to a particular part of the target on different wavelength bands in the matrix detector are located far away from each other. This complicates a reliable mutual identification of said picture elements, and it sets special requirements in view of focusing and adjusting said optical components, so that magnifications of images measured on different wavelengths become equally large in size. Correspondingly, a preferred embodiment of the mosaic filter disclosed in the patent publication U.S. Pat. No. 4,413,324 requires that each single filter is positioned accurately to correspond to one or several pixels of the detector. This is technically challenging and therefore expensive especially in cases of smaller production batches.

In view of the present invention, the solution disclosed in the patent publication U.S. Pat. No. 5,225,883 can be considered as the closest state of the art solution among the above-presented prior art solutions, and in said publication the suitability of the solution for measurement of moving or flowing target is also emphasized. Said publication does not, however, in any way mention the possibility of utilizing the movement of the target for recording spectrally resolved information and further for conducting spectroscopic measurement in a manner intended by the invention disclosed in the present application.

SUMMARY OF THE INVENTION

The purpose of the present invention is to eliminate the above-described restrictions and problems of prior art when imaging spectrally resolved measurements are conducted for such processes which include a moving or flowing target. One aim is to introduce a method which has a simpler structure when compared to prior art, and which can be implemented with a smaller number of components and adjustments and by means of which spectrally resolved imaging measurements can be conducted in a more reliable and economical manner especially in industrial process conditions demanding in view of the mechanical durability of the measuring device. Another aim is to enable optimal measurement of several spectroscopic and/or non-spectroscopic parameters and/or mere visualization of the target by using a single compact measuring device without having to conduct changes of components, such as optical filters in the measuring device and/or other significant modifications or mechanical adjustments.

To attain this purpose, the present invention provides an imaging method, an imaging device, and a use of information measured by imaging measurement in process control and/or adjustment as described herein.

The invention is characterized by the new, inventive feature that considerably simplifies and facilitates the implementation of spectrally resolving spectroscopic imaging measurements and the measuring devices necessary therein as well as the use of said measuring devices. According to the invention the movement of the target to be measured itself is utilized to record spectrally resolved signals to be measured at wavelength bands differing from each other. This is attained by recording signals which are produced when an image point which is focused on the screen of the matrix detector without beam splitting and which corresponds to a fixed part of the target to be measured travels under the effect of the movement of the target via filter areas transmitting radiation in manners differing from each other. In other words, the spectroscopically measured parameter of a particular part of the target is defined using imaging together with comparison and/or combining information received from the different filter areas in the aforementioned manner. In such imaging taking place without beamsplitting the image of the target is not duplexed etc. on the screen of the detector, and therefore at a fixed moment of time only one image point corresponds to a single small part of the target.

Said filter areas are attained by means of filters with a simple structure which are placed substantially immediately in front of the detector, or which are placed in the intermediate focus of the applied front optics. Because according to the invention said filter areas can have a large area compared to the size of single pixels of the matrix detector, each filter area therefore advantageously covering hundreds or thousands of single pixels, it is possible to align and adjust them with respect to each other and to the detector in a simple manner and it is not necessary to specially align the filter areas to correspond to certain individual pixels in the detector. The aforementioned properties make it possible to manufacture measuring devices according to the invention profitably in small product batches optimized for different purposes of use.

It is characteristic to the invention that said filter areas necessary for spectroscopic measurement cover the screen of the matrix detector only partly, wherein the remaining part of the imaging area of the detector can be used for other non-spectroscopic measurements and/or visualization of the target. In the monitoring of an industrial process, it is often advantageous to conduct mere visualization of the target, in other words to transmit unprocessed or only slightly processed real-time image to the operator monitoring/adjusting the process. In the method/device according to the invention this can be easily implemented by utilizing the imaging area of the matrix detector which is either unfiltered or filtered in a manner suitable especially for visualization. By utilizing the possibility of visualization, the imaging area monitored/measured of the target can be easily defined by the operator, in other words the imaging device can be easily and accurately focused to a desired target area.

When compared to prior art, in the solution according to the invention, if necessary, it is also easy and simple to use more than two filters that filter the radiation in different manners. Correspondingly, this enables substantially simultaneous use of more than one spectroscopic measuring method without need for changing and/or adjusting the optical components but still maintaining the spectral bands to be used always optimally selected for a given purpose and spectroscopic measurement.

BRIEF DESCRIPTION OF THE DRAWINGS

In the following, the invention will be described in more detail with reference to the appended drawing, in which FIG. 1 shows a side-view of an arrangement according to the invention for conducting spectrally resolved measurement of a moving or flowing target, FIG. 2 shows a side-view of an alternative arrangement according to the invention for conducting spectrally resolved imaging measurement of a moving or flowing target, FIG. 3 shows an arrangement of filter areas formed according to the invention on the imaging area of a matrix detector when seen from the direction of front optics perpendicularly to the screen of said matrix detector, FIG. 4 shows in a manner similar to FIG. 3 different alternative arrangements of the filter areas according to the invention on the imaging area of the matrix detector.

DETAILED DESCRIPTION OF THE PREFERRED EMBODIMENTS

Figure 5:
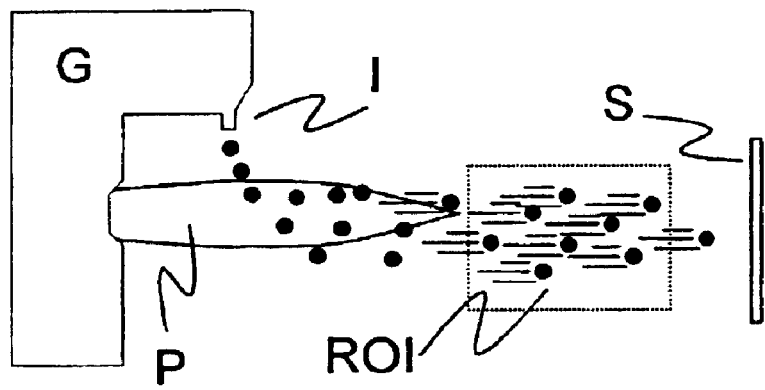
FIG. 5 shows a solution according to the invention in monitoring a thermal spray coating process.

FIG. 1 shows in a side view an arrangement according to the invention in which an image is formed of a moving or flowing target T by means of imaging optics L1 and via filters F1, F2 on the screen D of a two-dimensional matrix detector, which matrix detector, furthermore, is placed in a camera C. FIG. 2 shows an alternative arrangement according to the invention in which an image of the target T is produced by means of imaging optics L2 on filters placed on the intermediate focus of the optics L2 and L3, which image formed in the intermediate focus and travelling via the filters F1, F2 is further transferred to the screen D of the matrix detector by means of the optics L3.

The moving or flowing target T shown in FIGS. 1 and 2 (and correspondingly in FIGS. 3 to 4) can be a target with a substantially homogenous solid structure, substantially homogenous liquid structure or substantially homogenous gaseous structure, such as for example a hot, glowing metal object undergoing a rolling-mill practice, or a flow or flame produced by molten metal. The target may also have a heterogeneous structure, such as a gas flow containing solid or liquid particles, or correspondingly a liquid flow containing gas bubbles or solid particles. The temperature of the target can be any temperature as such, which is typical for the process under examination.

In FIGS. 1 and 2, the imaging optics L1, L2, L3 can be composed of one or several separate lenses each, or each optics L1, L2, L3 can be a so-called camera objective containing several lenses, which can further contain means for focusing the image on the matrix detector D, if necessary, as well as means for limiting the aperture of said optics to control the depth of focus and level of brightness of imaging. If the image is relayed on the matrix detector D via more than one intermediate focuses, there may be several imaging optics in use, if necessary, and they can be contained for example in an endoscope or another corresponding special optics used as front optics. If necessary, the imaging optics may also contain so-called field lenses placed in the immediate vicinity of the focal planes to improve the quality of the image.

The imaging optics L1, L2, L3 and the filters F1, F2 do not have to be located on the same straight optical axis, but it is also possible to use mirrors, if necessary, to deflect the direction of the optical axis, or the optics L1, L2, L3 themselves can also be implemented by utilizing concave ball mirrors, and, furthermore, the filters (when placed in the intermediate focus) can be implemented as reflecting components as well, if necessary.

In a situation according to the invention and seen from the direction of the imaging optics (L1 in FIG. 1 and L3 in FIG. 2) and perpendicular to the screen D of the matrix detector, FIG. 3 shows the filter areas FR 1 and FR2 formed on the light-sensitive area DA of said screen by means of filters F1, F2. In FIG. 3 broken lines also illustrate in principle how the moving or flowing target T is imaged on the screen D in situations according to FIG. 1 or 2.

FIG. 4 shows in a manner corresponding to FIG. 3 some alternative ways of arranging the filter areas according to the invention on the imaging area of the matrix detector. FIG. 4a shows an arrangement of two filter areas FR1 and FR2 which are small in size with respect to the surface area of the light-sensitive area DA of the detector and which filter areas are in contact with each other. FIG. 4b shows filter areas FR1 and FR2 which are not contacting each other, as well as filter areas FR3 and FR4 located on the other edge of the imaging area, wherein the properties of the filter FR3 correspond to those of filter FR1 and the properties of filter FR4 to those of filter FR2. Furthermore, FIG. 4c shows an arrangement of two non-rectangular filter areas whose sizes differ from each other. FIG. 4d further shows an arrangement of three filter areas FR1, FR2, FR3 that transmit radiation in different manners.

The invention is not restricted to the above-described ways of arranging the filter areas on the imaging area of the detector, but the size, shape and number of the filter areas can vary according to the embodiment in question in such a manner that under the effect of the movement of the target, an image point on the screen of the detector that corresponds to a certain part of the target, however, substantially travels via the filter areas necessary in the spectroscopic measurement in question.

To produce the filter areas on the screen D of the detector, the filters F1, F2 can be composed of uniform substrate material substantially transparent in the operating wavelength area of the detector, whose front and/or back surface/surfaces are/is at desired locations provided with a coating that reflects, absorbs or otherwise attenuates the radiation of the target in a desired manner, for example with a so-called dichroic multilayer coating. Alternatively, the filters F1, F2 can be made by replacing the desired areas in the above-mentioned, substantially transparent substrate material with a material that absorbs or otherwise attenuates the radiation in a desired manner, for example with a colored glass. Furthermore, the assembly containing the filters F1, F2 can be formed in such a manner that it does not contain any actual substrate material at all in those parts in which the aim is not to affect the properties of radiation travelling therethrough, but the filter structures F1, F2 corresponding to the actual filter areas FR1, FR2, which are formed in any of the ways described above, are attached separately directly on the screen of the detector D (the situation shown in FIG. 1), or the aforementioned filter structures F1, F2 are attached and positioned with respect to each other by means of a suitable mechanical member, such as wiring (the situation shown in FIG. 2), said member itself having as thin a structure as possible so that it disturbs the transmission of radiation as little as possible. The filters F1, F2 can contain/have a structure of a so-called diffractive component, in which the areas corresponding to the different sections of the light-sensitive area DA of the detector are manufactured in desired shapes and in the desired manner to form filter areas according to the invention on the screen of the detector D. The filters can also be formed by combining the aforementioned different structural solutions and furthermore, the filters corresponding to the different filter areas can be located at different locations for example in such a manner that the first filter F1 is placed in front of the detector D (according to FIG. 1) and the second filter F2 is placed in the intermediate focus of the front optics (according to FIG. 2). Furthermore, the filter areas FR1, FR2 formed on the light-sensitive area DA of the detector can be produced by means of such filter element whose transmission/reflection changes as a function of place in such a manner that at a particular point of the filter element the transmission/reflection of the same corresponds to the filter F1 and at another point to the filter F2. The filter element of said kind that contains a changing/sliding spectral response can be manufactured by using the aforementioned structural solutions, for example by means of dichroic coatings.

The two-dimensional matrix detector D, which is positioned in the camera C, can be for example a so-called CCD detector, which, being a silicon-based detector, operates in the wavelength range of 200 to 1100 nm, and it can contain a so-called electric shutter function to control pixel exposure. In CCD detectors of this kind the number of pixels can, for example, in a ⅔-inch detector be 1280 pixels in the horizontal direction and 1024 pixels in the vertical direction, wherein the size of single pixels is for example 6.7 micrometers multiplied with 6.7 micrometers. Depending on the embodiment, the detector can, however, be a matrix detector of another type in which the size of the light-sensitive imaging area of the detector and the number of pixels can vary, and the shutter time of the detector can be adjusted by using a separate external mechanical or electro-/magneto-optic shutter. In wavelength ranges of 900 to 1700 nm, the detector can be for example a 1-inch matrix detector of 320 pixels×240 pixels, made of InGaAs semiconductor. The detector can also be a so-called CMOS detector. Furthermore, all pixels of the matrix detector can contain an equal spectral wavelength response, or different pixels can contain a different spectral wavelength response. In other words, the detector can also be for example a colour camera. The exposure times of the different pixels of the detector can be adjusted in different ways between different pixels by means of an internal electric shutter function. Similarly, in the camera the gain of the electric signal to be read from different pixels of the detector can be adjusted in different ways between different pixels, and the signals of several adjacent pixels can be added together before reading by means of a so-called binning function.

The camera C to which the matrix detector D is placed takes care of changing the optical signal collected by the detector to an electric format and controls the electric functions of the detector as well. The aforementioned control commands can arrive directly from a computer in an electric format or manually via switches set by the user in the camera. The camera C can be a so-called digital camera in which the image captured by the detector is changed already in the camera itself into a digital format expressed by a binary code, which binary information is transmitted further to the actual measuring computer for image processing and calculation to be conducted at a later stage. Alternatively, the camera C can also be a so-called analog video camera from which the image captured by the detector is transmitted first as an analog video signal to a computer, in which the analog signal is changed into digital format for example by means of a suitable so-called image capture card. It is also possible that the camera C can contain a microprocessor of its own or corresponding circuit/circuits so that image processing can be conducted entirely or partly already in the camera before information is transmitted forward.

In the following, the invention will be described further in more detail, using the use of the invention in the control of a thermal spray coating process as an example.

FIG. 5 illustrates the principle of a thermal spray coating process. Coating material is fed in a powder form from a feeding port I to the hot gas flame P flowing from the spraying device G. Said gas flame can be a so-called plasma flame produced by means of an electric arc, or a gas flame generated by burning of reactive gas components. In the flame P, the coating particles melt and they are accelerated to a certain velocity before they impact on the target S to be coated. When the molten or partly molten coating particles impact on the target to be coated they flatten and cool down into thin lamellas. The layering of the aforementioned lamellas on the surface of the target S forms the desired coating. Known thermal spray coating processes that are widely used industrially include for example plasma spraying, HVOF spraying, detonation spraying and flame spraying. By means of these spraying methods it is possible to manufacture for example metal, ceramic or plastic coatings for widely varying purposes.

In thermal spraying the in-flight properties of the coating particles just before they impact on the target to be coated are essential in view of the properties and quality of the coating to be produced. In this respect the most important parameters of the coating particles are the temperature, velocity, number and size of the particles, as well as the local distribution of these parameters in the flame.

The method according to the invention enables both imaging spectroscopic and imaging non-spectroscopic measurements by means of the same measuring device, as well as also in-flight visualization of the coating particles/particle jet before the particles/particle jet impacts on the target S to be coated. In FIG. 5 broken lines show an imaging region ROI suitable for such process monitoring. In this example, the parameter to be measured spectroscopically according to the examples described hereinbelow is the pyrometric two-color temperature of the coating particles, and parameters to be determined non-spectroscopically include e.g. the velocity and instantaneous number of the coating particles. As a result of the imaging method it is possible to obtain spatially resolved information of the aforementioned parameters, i.e. local distributions of said parameters from the imaging region ROI.

Figure 6:
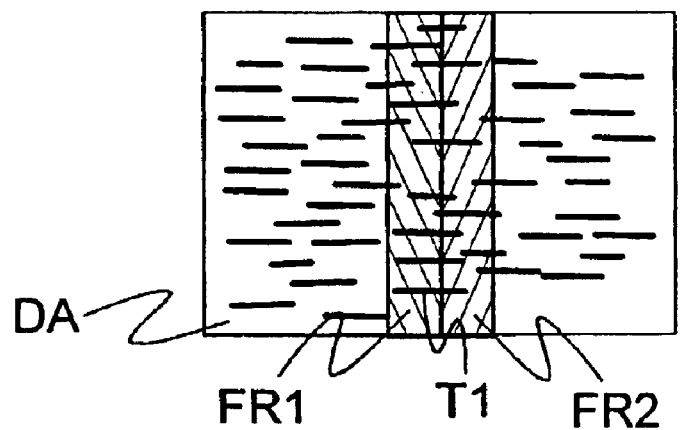
FIG. 6 shows in the situation according to FIG. 5 the image produced by the particle jet on the matrix detector when the exposure time used in the detector is short in relation to the velocity of the coating particles.

FIG. 6 shows the image produced by the hot coating particles on the matrix detector in a situation where the exposure time used in the detector is short in relation to the velocity of the coating particles. Thus, individual coating particles are imaged as separate streaks on the light-sensitive area DA of the detector by means of the thermal radiation emitted by the coating particles themselves, the length of the streaks depending on the used exposure time and the velocity of the particles. In FIG. 6 one such streak produced by one coating particle is marked with T1. When filter areas FR1 and FR2 are arranged on the imaging area of the detector according to FIG. 6, spectrally resolved information is attained on the two wavelength bands corresponding to said filter areas from the emission of individual particles passing the border between said filter areas during the exposure time. The measurement takes place in such a manner that the time difference between the measurements for the individual particles on said two wavelength bands is shorter than the exposure time used in the imaging. When said two wavelength bands are selected in a suitable manner it is possible to use the emission measured by means of the same to determine the two-color pyrometric temperature of individual coating particles with the assumption that the temperature of the particles does not substantially change within the scope of the exposure time used in the imaging. Typically for example in plasma spraying the velocities of coating particles are often hundreds of meters per second, wherein, in practice, the situation according to FIG. 6 is attained by using exposure times in the order of microseconds. By means of image processing techniques it is easy to identify the different parts of the streaks (e.g. T1) shown in FIG. 6 that are measured at different wavelengths and located close to each other, when compared to methods in which images corresponding to the same area of the target, for example a particle, and measured at different wavelengths are located relatively far from each other on the light-sensitive area DA of the detector (e.g. U.S. Pat. Nos. 5,963,311 and 5,225,883).

Figure 7:
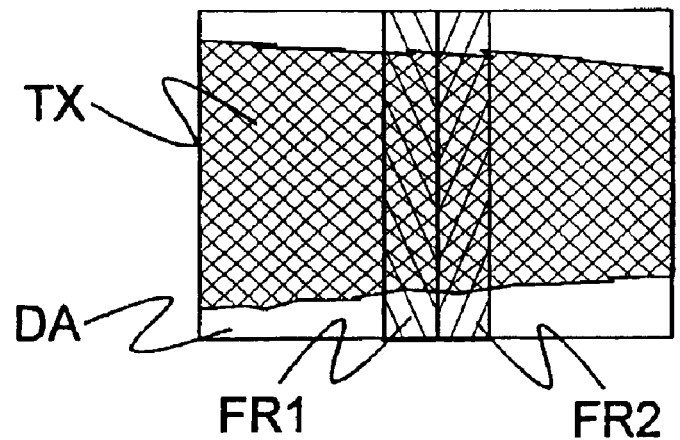
FIG. 7 shows in the situation according to FIG. 5 the image produced by the particle jet on the matrix detector when the exposure time used in the detector is long in relation to the velocity of the coating particles.

FIG. 7 shows in a corresponding manner the image produced by hot coating particles on the matrix detector in a situation where the exposure time used in the detector is long in relation to the velocity of the coating particles. Thus, the measuring result obtained from the filter areas FR1 and FR2 contains measured values of emission which are summed/integrated as a result of motion of the particle jet TX in relation to the location and time, by means of which values it is also possible to calculate a two-color pyrometric temperature and local distribution of the same transversely with respect to the particle jet. By using a long exposure time it is not, of course, possible to determine the temperatures of individual coating particles.

According to the principles shown in FIG. 7, a long exposure time in relation to the velocity of the target must be used in signal-restricted situations, for example when the used spectroscopic method or the radiation properties of the target make it necessary to select the spectral bands corresponding to the filter areas so that they are spectrally very narrow, i.e. that they permeate a small amount of radiation. The situation is of this kind when the aim is to measure only the radiation of fixed narrow spectral lines, or when the aim is to prevent certain spectral lines that are close to the measuring wavelengths and possibly interfere with the measurement from ending up in the same measuring result. In the aforementioned situation, when a short exposure time is used and the aim is to distinguish e.g. individual particles, the signal integrated to the corresponding pixels does not exceed the detection limit at all or its signal/noise ratio remains too low. If the method is based on the utilization of spontaneous emission of the target itself, it is not, for example, possible to detect targets with too low a temperature by means of short exposure times.

It is a considerable advantage of the present invention that in signal-restricted situations of the above kind for example pyrometric two-color temperature measurement can be conducted in an integrated manner and using average values by utilizing long exposure time and spectral bands/filter areas selected optimally for said pyrometric measurement. With the same device it is now possible to conduct other measurements or visualization by using a different exposure time and the rest of the unfiltered imaging area of the detector when necessary, and/or other spectral bands/filter areas optimized especially for other measurements or visualization in question.

The possibility provided by the invention to use various different measurements or visualization in an optimized manner is illustrated in the following, using the thermal spray coating process as an example.

According to the facts presented above, in FIGS. 6 and 7 the properties of spectral bands/filter areas FR1 and FR2 are selected to be suitable for two-color pyrometric temperature measurement, and the measurement can be conducted either for individual coating particles (FIG. 6) or for the particle jet (FIG. 7) in an integrated manner by means of average values, depending on the properties (e.g. temperature and/or particle density) of the target. The essential fact is that from the situation according to FIG. 6 it is possible to easily and rapidly move to a situation according to FIG. 7 by changing the exposure time of the matrix detector.

In the situation of FIG. 6 it is possible to determine the velocity of individual particles by means of a so-called time-of-flight principle known as such, when the exposure time used in the imaging and the magnification of the imaging optics are known. The measurement of the velocity of particles can, in principle, be implemented at any point of the imaging area, because the measurement of velocity is not dependent on the brightness of images produced by individual particles, but only on the length of streaks drawn by the said particles in the image. The measurement of the velocity of particles can also be implemented by using double or multi-exposure and by identifying the locations of the images corresponding to each individual particle, and the distances between said images which now correspond to the different exposures. If the images/streaks of individual particles are signal-restricted at the exposure time used in the measurement of velocity, it is in a manner characteristic to the invention advantageous to conduct the identification of the aforementioned images/streaks in the spectrally unfiltered imaging area of the detector, which thus has the maximum sensitivity as a result of its spectral band which is as wide as possible, i.e. unrestricted by filters.

In a manner corresponding to the above measurement of the particle velocity and in a manner known as such it is, of course, in the situation of FIG. 6, possible to determine the number of particles detected in the image in images taken successively, as well as in different parts of the imaging area. If the detection of particles is signal-restricted, it can also be advantageously conducted in the spectrally unfiltered imaging area of the matrix detector in a manner characteristic to the invention, or alternatively by using a long exposure time according to FIG. 7, wherein the number of particles in different parts of the imaging field, and especially the distribution transverse to the direction of motion can be detected relatively on the basis of the local brightness of the image, and by taking into account the temperature distribution transverse to the direction of motion (FIG. 7), which is measured two-color pyrometrically at an earlier stage.

When the two-color pyrometric temperature of the coating particles is known, which temperature can be determined according to the known principles of pyrometry without the information on the size of the particle, it is, according to prior art known as such, possible to obtain further information on the size of the particle by utilizing the intensity of radiance emitted by said particle on a known wavelength band suitable for the purpose. In other words, the radiation emitted by a particle in a fixed temperature depends on the size of the particle, and if the temperature is known on the basis of the two-color pyrometric measurement, it is possible to calculate the size on the basis of the intensity of radiance of the particle. According to the invention, this measurement can be easily conducted by supplementing the system in the situation according to FIG. 6, if necessary, with a third filter area optimized especially for this purpose.

When the thermal spray coating process according to FIG. 5 is imaged, one significant practical problem is caused by the large variations in brightness occurring inside the imaging area, which set high demands for the dynamical range of the matrix detector in use, in other words for its capability to measure/detect emission of different scales of magnitude. If the left edge of the imaging region ROI shown in FIG. 5 is placed too close to the spraying device G, the brightness of the flame P may interfere with the actual detection of the coating particles by causing overexposure of pixels corresponding to the left edge of the imaging region ROI on the screen of the matrix detector. According to the invention this can be avoided by adding a separate filter area in said point in the imaging area, which filter area attenuates the radiation coming from the target to said imaging area in a suitable manner, thus reducing the requirements set for the dynamical range of the detector. When a process of another kind, for example a reactive flow is imaged, the need for attenuation of radiation may also occur in the direction of motion of the target in a different point in the imaging area than above, when the temperature of the target, the concentration under examination, or other corresponding factor is increased or changed in another manner as a result of the reactions occurring in the process.

As was already mentioned above, in thermal spray coating processes the local distribution of the parameters of the coating particles in the flame is also important in view of controlling and adjusting the process. For example in the situation shown in FIG. 5, when coating particles are fed in the form of powder along with so-called carrier gas from port I, if the flow rate of said carrier gas is adjusted too low the coating particles do not penetrate the hot inner parts of the flame P in the intended manner. In a corresponding manner when a high flow rate of the carrier gas is used, the coating particles penetrate directly through the flame. In both cases the parameters of the coating particles hitting the target S, such as the temperature and velocity deviate from the optimal values.

Figure 8:
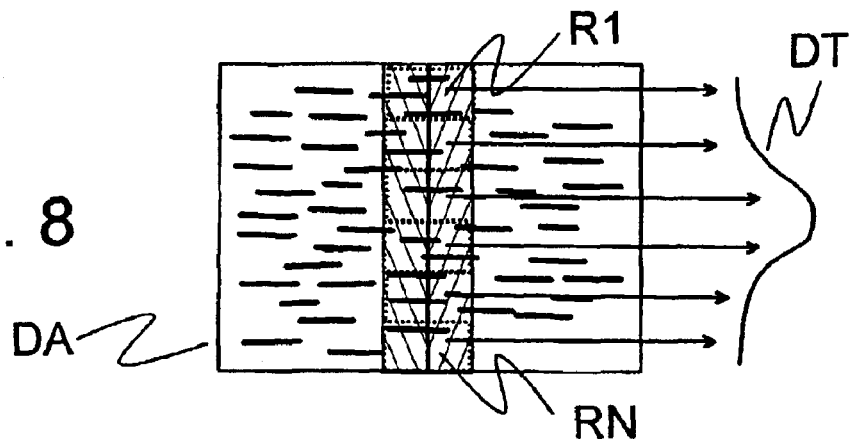
FIG. 8 shows how the parameter defined from the target by means of filter areas is utilized to produce a local distribution of said parameter, transverse to the motion of the target.
Figure 9:
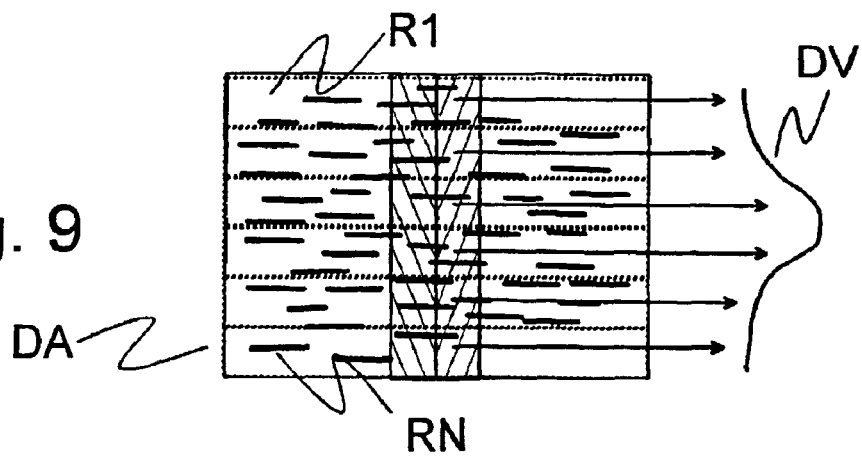
FIG. 9 shows how the parameter defined from the entire imaging area in the target is utilized to produce a local distribution of said parameter, transverse to the motion of the target.
Figure 10:
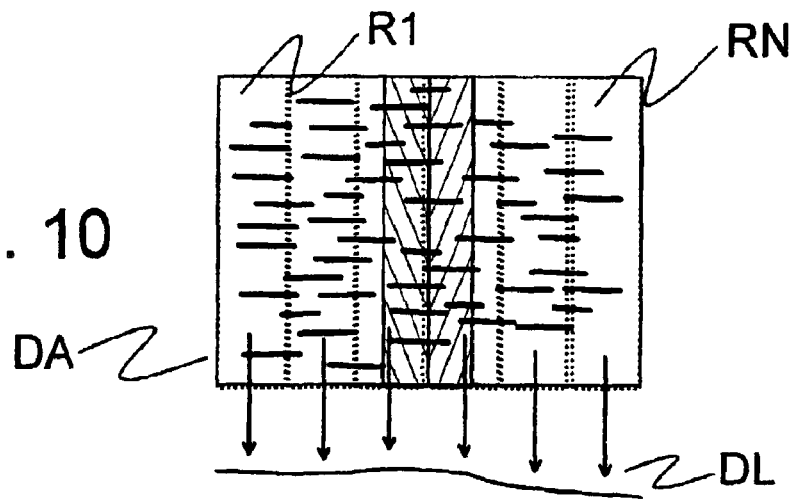
FIG. 10 shows how the parameter defined from the entire imaging area in the target is utilized to produce a local distribution of said parameter, parallel to the motion of the target.

FIGS. 8 to 10 illustrate by means of examples ways of determining the local distributions of some parameters of coating particles in a thermal spray coating process that are made possible by the imaging method according to the invention. It is, of course, obvious that the local distributions of parameters measured at a given time within the scope of the inventive features presented in the claims can be determined in a corresponding manner in other kinds of processes.

FIG. 8 shows in principle the act of determining the local distribution DT of the two-color temperature of coating particles, transverse with respect to the movement of the particles. The two filter areas marked with a hatching in FIG. 8 and used in the process of determining the temperature of the particles are further divided into smaller observation areas R1 to RN, and the temperatures of individual particles determined inside each observation area R1 to RN are calculated inside the same either as instantaneous average values or average values cumulative with respect to time, and said average values are utilized to form the distribution DT. Thus, it is possible to form an instantaneous temporary distribution on the basis of one image taken by means of the measuring device, or a cumulative distribution on the basis of several successive images.

FIG. 9 shows in principle the use of the entire imaging area of the matrix detector with respect to the movement of particles in defining a distribution DV transverse to the movement of particles, for example in defining the number distribution or velocity distribution of particles. Furthermore, FIG. 10 shows in a corresponding manner in principle the act of defining the distribution of the particles in the direction of movement, for example the number distribution or velocity distribution.

In FIGS. 8 to 10 the size of the observation areas R1 to RN used in forming the distributions can vary according to the need, and they may only contain filter areas formed in the detector, or imaging area located outside the filter areas, depending on the parameter in question. In addition to the aforementioned distributions, it is, of course, also possible to determine other statistics from the parameter/parameters defined from the target/targets by means of imaging, if necessary.

The state of the thermal spray coating process and the function of the spraying apparatus can be controlled by monitoring the local distributions of the essential measuring parameters that are formed in the above-described ways and illustrate the state of the coating particles and thus the state of the process, and/or other statistics as well as changes occurring in these distributions or statistics. The coating process can be adjusted further, if necessary, either manually or automatically by using said measurement results in such a manner that optimal operating conditions are attained. The visualization of the target that becomes possible by means of the invention, i.e. the real-time image transmitted from the target to the operator also facilitates the control and adjustment of the process as such. The visualization facilitates and accelerates especially for example the preliminary inspections and adjustments required in the process in connection with the change of the wearing parts of the spraying device G (nozzles, etc) and/or coating material and/or coating material batch. By means of visualization the imaging measuring device can also be directed accurately to the desired location.

It is, of course obvious that the use of the invention is not restricted solely to the research, monitoring and adjustment of the thermal spray coating process described above as an example, but within the scope of the inventive features presented in the claims it can also be applied in other processes that contain a moving or flowing target/moving or flowing targets.

Furthermore, within the field of spectroscopic methods, the use of the invention is not restricted to the mere use of pyrometry, but other imaging measurement methods can be advantageously implemented by means of the invention. In addition to spectral definition, the different filter areas formed on the imaging area of the detector may also contain properties which are mutually dependent on the polarization of the radiation to be measured in different ways. The method for illuminating the target under examination is not significant in view of the invention, but the target/targets to be examined can emit radiation themselves and/or scatter radiation obtained from other sources.

It is, of course, obvious that in such situations in which the target/targets are detected on the basis of the radiation scattered by the same, the movement of the target/targets in the image can be stopped by using either a substantially continuously operating light source as well as a sufficiently short shutter time in the detector at the same time. Alternatively, by using a short light impulse/impulses, in other words stroboscopic illumination, it is possible to use a shutter time long as such with respect to the velocity of the target/targets. In both these ways it is possible to attain the same effective exposure time with respect to the detection of the target, which fact is also stated in the claim by using the term effective exposure time instead of the term exposure time.

When such a target is imaged which contains smaller targets that can be distinguished separately on the imaging area DA, it is also possible to use two or more successive exposures instead of a single exposure in the detection of said targets by means of the radiation emitted spontaneously by the same. For example in the situation of FIG. 6, the targets depicted in streak-like form (e.g. T1 in FIG. 6) on the imaging area DA of the detector would then be depicted as two or several successive dots each. The dots which are produced by one such target and which occur in the different filter areas can be used according to the invention instead of the aforementioned streak to implement spectroscopic measurements.

When exposure sequences composed of three or more single (short) successive effective exposures (determined by the light impulse and/or the shutter time of the detector) are used and one or more intervals between the sequences are adjusted between said sequence so that they become different in size when compared to the other intervals, it is possible to determine the direction of motion/flow of the target/targets. By using exposure sequences formed of four or several single successive effective exposures, it is also possible to determine the speed of change in other words acceleration or deceleration, in the velocity of motion/flow of the target/targets.

The imaging measurements of the different parameters of the process can be implemented substantially in real time by utilizing matrix detector/camera apparatuses and computer apparatuses which are already commercially available at present. For example by processing images taken at the rate of 25 images per second as a continuous process by means of an effective computer and image processing algorithms, it is possible to use the parameters defined in this manner in the real-time monitoring and control of the process under examination. In processes such as thermal spray coating of certain targets inside a structure, the measurement of which during the actual operation of the process is difficult or impossible, the operation of the process device, for example the operation of the spray coating device in particular, can be rapidly ensured by means of imaging measurement immediately before and after the actual process operation. If it is thus detected by means the measured parameters that a change has occurred in the function of the spraying device, it is possible to interrupt the actual function of the process, if necessary, for adjustments and/or repairs of the spraying device.

It is, of course, obvious that by producing a motion between the target to be measured and the measuring device according to the invention by means of a suitable external method, it is also possible to conduct measurements according to the invention for such targets which do not naturally contain a moving or flowing target. Such methods can be for example the act of moving or rotating the imaging measuring device itself, or correspondingly, the act of transmitting an image of the target via rotating or vibrating reflective optics.

In certain situations it is also possible that the use of only a single filter area added to the imaging area of the detector is sufficient for conducting a certain spectroscopic measurement. Thus, the so-called unfiltered imaging area of the detector and the spectral response of the same is used as one wide measurement wavelength band and within said added filter area there is another narrower measurement wavelength band available, which is more precisely restricted but remains spectrally inside the preceding one. This solution is, however, less advantageous in view of the solution according to the invention as a result of the obvious and restricted possibilities in the selection of said spectral bands.

What is claimed is:

1. A method for conducting an imaging, spectrally resolving spectroscopic measurement of a moving or flowing target, in which method the electromagnetic radiation obtained from said target is focused by means of imaging optics to produce an image on the screen of a two-dimensional matrix detector at least via a first and a second filter which transmit electromagnetic radiation in manners differing from each other, wherein said at least first and second filter form on the screen of the detector at least a first and a second filter area that together partly and only partly cover the light-sensitive area of the detector, and wherein the properties of at least one fixed part of the target are determined spectroscopically by comparing and/or combining spectrally resolved information corresponding to said fixed part of the target and said information is recorded sequentially in time when an image point which corresponds to said fixed part of the target and is focused on the screen of the detector without beamsplitting travels as a result of the movement of the target substantially via said at least first and second filter area, and wherein the area of the screen of the detector remaining outside said at least first and second filter area is used for at least one other imaging non-spectroscopic measurement and/or visualization of the target.

2. The method according to claim 1, wherein said at least first and second filter are located close to the screen of the detector, in front of the screen in the direction of incidence of electromagnetic radiation attained from the target, next to each other substantially on the same plane and substantially parallel to the screen.

3. The method according to claim 1, wherein said at least first and second filter are located next to each other substantially on the same plane with each other, and in the intermediate focus of the imaging optics used in focusing electromagnetic radiation attained from the target.

4. The method according to claim 1, wherein said at least first and second filter area are located next to each other on the screen of the detector, not on top of each other but contacting each other laterally, or adjacently not on top of each other but apart from each other.

5. The method according to claim 1, wherein said at least first and second filter area each cover an area which is macroscopic with respect to single pixels of the detector.

6. The method according to claim 1, wherein said at least first and second filter area are also used for said imaging non-spectroscopic measurement and/or visualization of the target.

7. The method according to claim 1, wherein the effective exposure time of the detector used for detecting the target to be imaged is short in relation to the velocity of said target, and therefore, measured values describing the local and instantaneous state of said target are obtained as a measurement result.

8. The method according to claim 1, wherein the effective exposure time of the detector used for detecting the target to be imaged is long in relation to the velocity of said target, and therefore, measured values summed/integrated in relation to the location of said target and time are obtained as a measurement result.

9. The method according to claim 7, wherein said effective exposure time is adjusted in such a manner that when the target is composed of individual targets which are distinguishable against their background and emit and/or scatter radiation, the images/image streaks produced by said individual targets on the screen of the detector are substantially distinguishable from each other on said screen.

10. The method according to claim 9, wherein the spectroscopic and/or non-spectroscopic method used in the measurement is applied separately for each individual target distinguished separately.

11. The method according to claim 1, wherein the parameter to be determined spectroscopically from the target that is imaged is the pyrometric temperature of said target or of smaller targets individually distinguishable inside said target.

12. The method according to claim 1, wherein instantaneous or cumulative local distributions and/or statistics of parameter/parameters defined from the target by means of imaging are also determined.

13. An imaging measuring device for spectrally resolving spectroscopic measurement of a moving or flowing target, which measuring device comprises at least an imaging two-dimensional matrix detector, at least a first and a second filter, and imaging optics for focusing electromagnetic radiation obtained from the target to be imaged on the screen of said detector via said at least first and second filter which transmit electromagnetic radiation in manners differing from each other, wherein said at least first and second filter are arranged to form on the screen of the detector at least a first and a second filter area that together partly and only partly cover the light-sensitive area of the detector, and wherein the device further comprises means for determining the properties of at least one fixed part of the target spectroscopically by comparing and/or combining spectrally resolved information corresponding to said fixed part of the target and recorded sequentially in time when an image point which corresponds to said fixed part of the target and is focused on the screen of the detector without beamsplitting is arranged to travel as a result of the movement of the target substantially via said at least first and second filter area, and wherein the device further comprises means for using the area of the screen of the detector remaining outside said at least first and second filter area for at least one other imaging non-spectroscopic measurement and/or visualization of the target.

14. The imaging measuring device according to claim 13, wherein said at least first and second filter are located close to the screen of the detector, in front of the screen in the direction of incidence of electromagnetic radiation attained from the target, next to each other substantially on the same plane and substantially parallel to the screen.

15. The imaging measuring device according to claim 13, wherein said at least first and second filter are located next to each other substantially on the same plane with each other, and in the intermediate focus of the imaging optics used in focusing electromagnetic radiation attained from the target.

16. The imaging measuring device according to claim 13, wherein said at least first and second filter area are located next to each other on the screen of the detector, not overlapping but contacting each other laterally, or adjacently not overlapping but being apart from each other.

17. The imaging measuring device according to claim 13, wherein said at least first and second filter area each cover an area macroscopic with respect to the single pixels of the detector.

18. The imaging measuring device according to claim 13, wherein said at least first and second filter are manufactured on the front and/or rear surfaces of a substantially transparent planar substrate material by applying in the operating wavelength area of the detector one-layer or multilayer coating/coatings that reflect and/or absorb/attenuate radiation.

19. The imaging measuring device according to claim 13, wherein said at least first and second filter are made of colored glass.

20. The imaging measuring device according to claim 13, wherein the matrix detector is a CCD matrix camera, a GaAs matrix camera or a CMOS camera.

21. The use of information in monitoring or controlling a process, which information is measured by spectrally resolved imaging from a moving or flowing target to a two-dimensional matrix detector via imaging optics and at least a first and a second filter transmitting electromagnetic radiation in manners differing from each other, wherein the properties of at least one fixed part of the target or smaller target/targets which can be distinguished individually inside said target are determined by means of imaging and spectroscopically by comparing and/or combining signals, which are recorded sequentially in time when an image point which corresponds to said fixed part of the target/targets and is focused on the screen of the detector without beamsplitting travels as a result of the movement of the target/targets substantially via at least a first and a second filter area which are formed on the screen of the detector by means of filters and which partly and only partly cover the light-sensitive area of said screen the area of the screen of the detector remaining outside said at least first and second filter area is used for at least one other imaging non-spectroscopic measurement and/or visualization of the target.

22. The use according to claim 21, wherein said at least first and second filter area are also used for said imaging non-spectroscopic measurement and/or visualization of the target.

23. The use according to claim 21, wherein the effective exposure time used in the imaging is adjusted to be short in relation to the velocity of the target, so that instantaneous or local measured values of said target are recorded in the measurement and/or smaller targets located individually in the target inside the imaging area are distinguished as being separate from each other.

24. The use according to claim 21, wherein the effective exposure time used in the imaging is adjusted to be long in relation to the velocity of the target, so that measured values summed/integrated in relation to the location of said target are recorded.

25. The use according to claim 21, wherein the pyrometric temperature of the target/targets is defined spectroscopically by means of spectrally resolved imaging information.

26. The use according to claim 21, wherein the velocity of the target/targets is defined by means of imaging according to the time-of-flight principle by using either a single short effective exposure time or several successive short effective exposure times.

27. The use according to claim 21, wherein the number of individual targets detected in the image by means of imaging is determined by utilizing the short effective exposure time.

28. The use according to claim 21, wherein instantaneous or cumulative local distributions and/or statistics of the parameter/parameters determined from the target/targets by means of imaging are also defined.

29. The use according to claim 21, wherein the process is a thermal spray coating process.

* * * * *